United States Patent
Hammond et al.

(10) Patent No.: US 7,025,187 B2
(45) Date of Patent: Apr. 11, 2006

(54) ELECTROMAGNETIC CLUTCH ASSEMBLY

(75) Inventors: Jonathan K. Hammond, Holley, NY (US); Stephen M Covert, Brockport, NY (US); James C Wright, Williamsville, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/860,367

(22) Filed: Jun. 3, 2004

(65) Prior Publication Data

US 2005/0269182 A1    Dec. 8, 2005

(51) Int. Cl.
*F16D 27/112*    (2006.01)

(52) U.S. Cl. ............... 192/84.961; 192/30 V

(58) Field of Classification Search .......... 192/30 V, 192/84.961, 200, 209; 417/319
See application file for complete search history.

(56) References Cited

U.S. PATENT DOCUMENTS

| | | | | |
|---|---|---|---|---|
| 3,205,989 | A * | 9/1965 | Mantey ............... | 192/84.941 |
| 4,441,864 | A * | 4/1984 | Watts et al. .......... | 417/319 |
| 4,619,351 | A * | 10/1986 | Takatoshi ............. | 192/35 |
| 4,808,870 | A * | 2/1989 | Gonda ................. | 192/84.961 |
| 4,860,867 | A | 8/1989 | Nishimura ............ | 192/84 C |
| 5,009,297 | A * | 4/1991 | Gonda ................. | 192/84.941 |
| 5,184,705 | A * | 2/1993 | Sekiguchi et al. ..... | 192/84.941 |
| 5,372,228 | A | 12/1994 | VanLaningham et al. | 192/84 R |
| 5,445,256 | A * | 8/1995 | Tabuchi et al. ....... | 192/84.96 |
| 5,560,464 | A * | 10/1996 | Gonda et al. ......... | 192/84.96 |
| 5,575,371 | A | 11/1996 | Gonda et al. ......... | 192/84.96 |
| 5,632,366 | A | 5/1997 | Mullaney ............. | 192/84.1 |
| 5,667,050 | A | 9/1997 | Hasegawa ............ | 192/84.961 |
| 6,095,305 | A * | 8/2000 | Yoshihara ............ | 192/84.961 |

FOREIGN PATENT DOCUMENTS

JP    58072727    4/1983

OTHER PUBLICATIONS

EP 05 07 6215 European Search Report dated Sep. 21, 2005.

* cited by examiner

*Primary Examiner*—Saul Rodriguez
(74) *Attorney, Agent, or Firm*—Patrick M. Griffin

(57) ABSTRACT

An electromagnetic clutch assembly of the leaf spring type has leaf springs the inner ends of which are fixed to a drive plate by conventional rivets, and the outer ends of which are fixed to the armature plate by special rivets having enlarged diameter shanks that extend through clearance holes in overlaying portions of the drive plate. Rubber damper rings are trapped beneath an enlarged head of the rivet, against the outer surface of the driver plate, without intruding into the radial clearance. The clearance holes allow the rubber rings to compress freely as the leaf springs flex when the clutch is activated. During operation, the transmission of torsional vibrations back through the drive plate and springs to the armature plate is dampened by the compressed rubber rings.

4 Claims, 5 Drawing Sheets

ELECTROMAGNETIC CLUTCH ASSEMBLY

TECHNICAL FIELD

This invention relates to electromagnetic clutch assemblies for selectively transferring rotation from a rotary power source to a fluid pump, and specifically to one in which the pump, when operating, is liable to transmit torsional vibrations back to the power source.

BACKGROUND OF THE INVENTION

As with any rapidly rotating power source and an apparatus driven thereby, it is desirable to be able to selectively make and brake the driving connection quickly and remotely, and to transfer torque between the two smoothly, quietly and efficiently. A good example is a typical automotive engine driven air conditioning compressor. While some newer compressors are either electrically driven directly, or of a clutchless variable capacity design, many if not most are still engine driven, and thus require a clutch.

Such a clutch is typically electromagnetically activated, in response to a signal indicating air conditioning demand, by a coil assembly. The coil is mounted stationary to the front of the compressor housing, and is axially opposed to a pulley that rotates freely on a bearing located on the compressor housing and which carries an annular friction disk. The pulley is spun by an engine driven belt, but is axially stationary. The compressor drive shaft extends axially out of the compressor housing and through the pulley assembly with radial clearance. A central hub is fixed to the end of the shaft, and an integral or fixed drive plate radiates out from the hub, typically, though not necessarily, with three arms or lobes. An annular armature plate of magnetic material, typically low carbon steel, is axially opposed to the friction disk of the pulley, and, when pulled into firm axial engagement therewith by the magnetic attraction of the activated coil behind the pulley, spins with the pulley one-to one.

In order to transfer torque from the spinning armature plate to the drive plate and compressor shaft, an additional mechanism is necessary to mount the armature plate to the drive plate in its engagement ready position. and to return it thereto when de activated. Such a mechanism, ideally, will also serve to dampen the noise of plate to pulley engagement and disengagement. Another issue is torsional vibrations that can be created within the compressor as it pumps. Two main compressor torsional vibrations are of concern. One is the primary pumping order of the compressor, dependent upon its number of pistons, which exists at all compressor speeds. The second is compressor's own shaft resonance. Either or both of these may resonate with a vehicle's own operating frequency, creating excessive noise and vibration. A means associated with the clutch to dampen torsional vibrations is therefore also desirable.

An old and basic armature mounting mechanism that provides torque transfer and automatic decoupling, but no significant vibration dampening function, consists of just a plurality of leaf springs, typically three, riveted at each end between the annular armature plate and the drive plate. The springs, in a free state, hold the face of the armature plate in ready position a short axial distance, typically a millimeter or two, away from the face of the pulley. The springs are flexed out of that free state when the coil is energized to pull the armature into pulley engagement, and snap back to return the armature to ready position when the coil is deenergized. The leaf springs are oriented at an angle to a chord of the armature plate circle, and act in compression to transfer torque from the armature plate to the drive plate, pushing it, if effect, rather than dragging it. While simple, robust and durable, the basic parts of this mechanism provide no noise cushioning or vibration dampening. Simple rubber bumpers can be added through the drive plate, facing the armature plate and acting independently of the springs, to cushion the noise of disengagement, but these still provide no significant vibration dampening.

One early and simple modification to the basic system was a ring of rubber located intermediate the drive plate and the hub, as seen in U.S. Pat. No. 3,205,989. All torque was transferred through the ring, so that vibrations were well isolated, but rubber is not robust or durable as a torque transfer means, compared to tight metal-to-metal contact, such as riveted springs. Other designs eliminate the metal springs entirely, with several large and discrete rubber elements or "eyes" that are pulled axially out and retract to provide the return spring function, and which are compressed normal to the axial direction to provide dampening. An example may be seen in U.S. Pat. No. 5,184,705. Typically, an enlarged metal rivet fixed to the armature plate extends axially through matching holes in the drive plate and armature, surrounded radially by a rubber member that is either inserted or molded in place. Such designs have similar or worse durability issues than a continuous rubber ring, since the rubber is doing double duty, serving as both axial return spring and torsional damper.

A recent compromise simply combines the standard leaf spring design, with no damping provision, with an independent plurality of discrete, rubber "eye" type dampers. One example may be seen in U.S. Pat. No. 5,667,050. As disclosed there, three conventional leaf springs interconnect the armature and drive plate, as do three independent "eye" type dampers. The design seeks to improve the durability of the rubber in the damper by breaking it into two discrete parts, a flanged rubber washer that is radially contained between the interconnecting rivet and the drive plate through hole, and a separate rubber washer contained between the rivet head and the surface of the drive plate. Such a combination design, in general, is complex and expensive, having three interconnecting leaf springs and three interconnecting dampers, as opposed to just one or the other. In addition, all known designs for dampers interconnecting the drive plate and armature plate have a rubber element radially contained in the space between the rivet and through hole, which is therefore subject to a repeated pinching or sheering stress as torsional oscillations occur. This has serious implications for the durability of the rubber material.

SUMMARY OF THE INVENTION

The subject invention provides a simpler and more robust and durable electromagnetic clutch in which the interconnection between the drive plate and armature provides torsional oscillation and damping, but without any extra interconnections between the drive plate and armature beyond the leaf springs themselves.

In the preferred embodiment disclosed, a drive plate fixed to the compressor shaft is fixed to an annular armature plate by three leaf springs of conventional design, which serve both to transfer torque and provide an axial retraction feature. The leaf springs are fixed at their radially inner end to the drive plate with conventional rivets, but at the their radially outer ends, the springs are fixed to the armature plate by three specially designed rivets that combine connection and damping features. The outboard rivets fix the leaf spring ends tightly to the armature plate, and have enlarged diameter cylindrical shanks that extend axially through slightly oversized holes in the drive plate, with radial clearance. The enlarged shanks terminate in enlarged heads spaced away from the outer surface of the drive plate lobes, with an annular rubber ring axially trapped between the enlarged heads and drive plate outer surface. No part of the rubber ring intrudes into the radial space between rivet and drive plate clearance hole.

The leaf springs, in a non-stressed state, maintain the armature plate in a ready position parallel to and axially spaced from the face of a belt driven pulley. When the coil is activated, the armature plate is pulled into the pulley, as the springs are flexed and the outboard rivets are simultaneously pulled freely through the drive plate lobe clearance holes, compressing the rubber rings, thereby cushioning the shock of initial engagement. As the armature plate and pulley begin to turn together in unison, torque is transferred from the powered armature plate, to the drive plate and compressor shaft, through the leaf springs. During compressor operation, torsional oscillations from the compressor shaft and drive plate, attempting to transmit back to the armature plate through the leaf springs, are dampened by the compressed rubber rings. The rubber rings, in operation, are not subjected to a debilitating shearing action, as with known rubber dampers, by virtue of not intruding into the rivet-drive plate through hole radial clearance.

The clutch disclosed is simple and low cost, as well as durable, providing damping with very little extra cost, compared to a conventional leaf spring clutch.

DESCRIPTION OF THE PREFERRED EMBODIMENT

Figure 1:
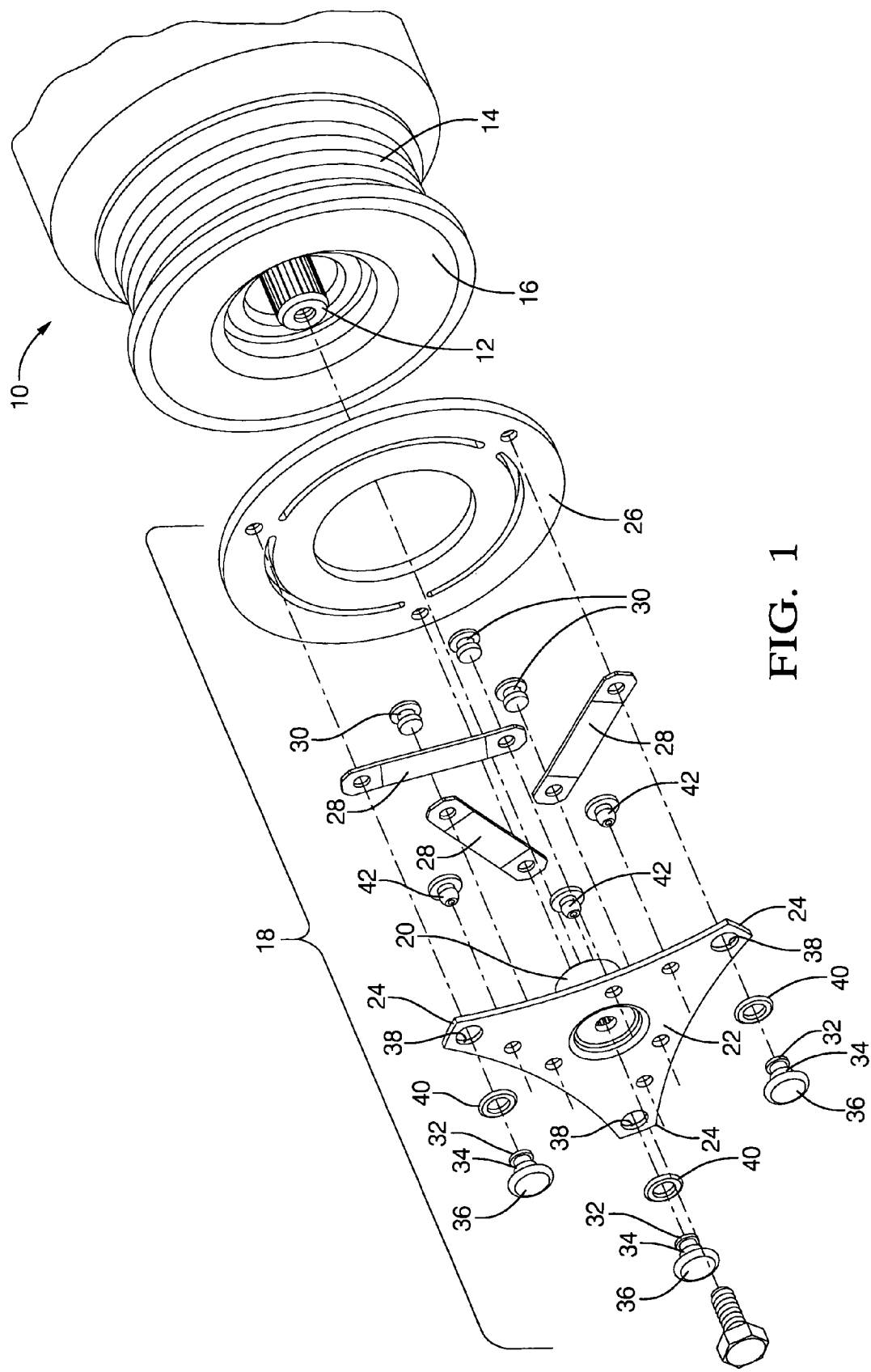
FIG. 1 is a perspective view of the front of a compressor housing and armature coil assembly, with the clutch assembly of the invention disassembled.
Figure 2:
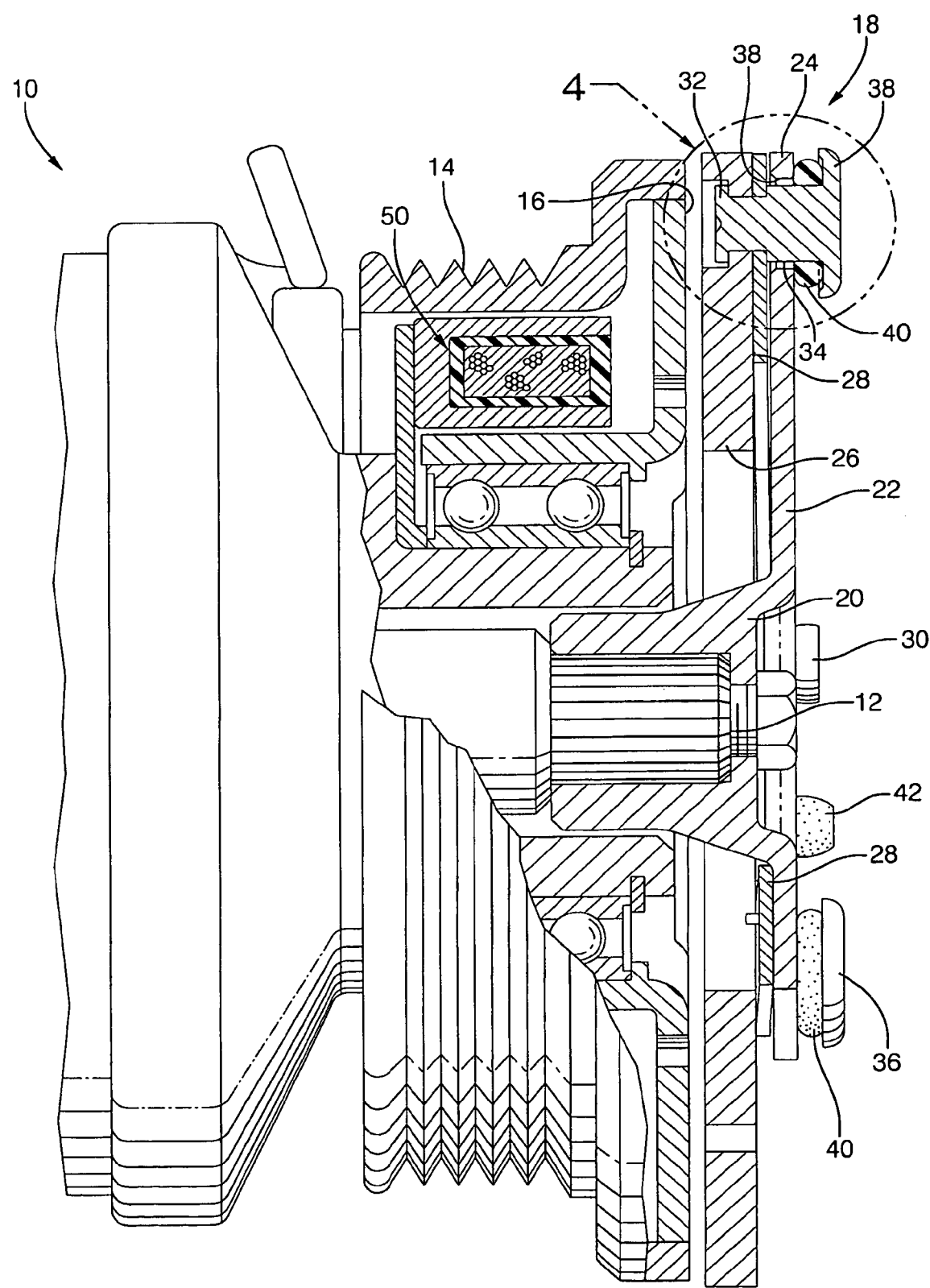
FIG. 2 is a side view of the front of the compressor, showing part of the pulley and clutch in cross section.
Figure 3:
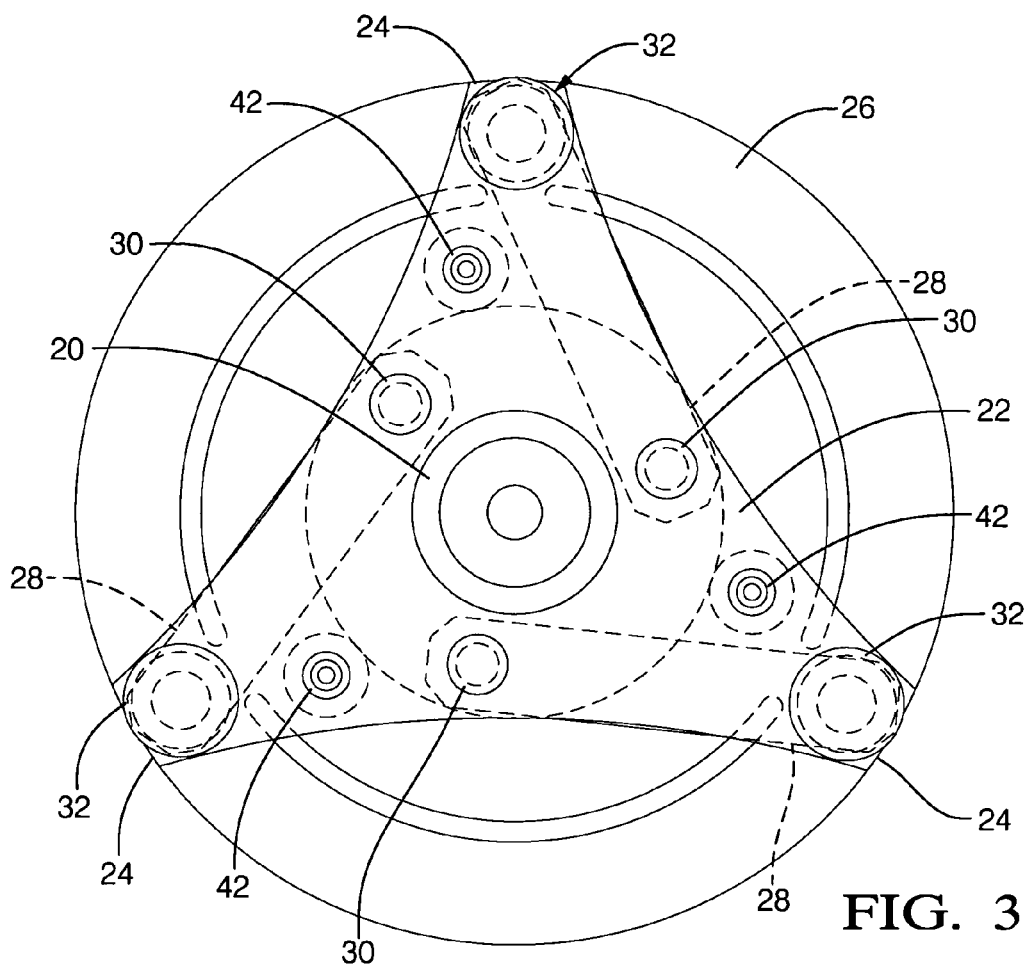
FIG. 3 is a plan view of the front of a preferred embodiment of the clutch of the invention.

Referring first to FIGS. 1, 2 and 3, a fluid pumping apparatus, such as an air conditioning compressor 10, has a central drive shaft 12 that drives the internal pumping mechanism, typically multiple reciprocating pistons, and through which torsional vibrations or oscillations may be potentially transmitted back to the power source. The power source is an engine belt driven pulley 14, which surrounds the end of shaft 12 with radial clearance and which rotates freely on an axially stationary bearing mounted to the front of compressor 10, such as an angular contact roller bearing. Behind pulley 14 is an electromagnetic coil 50, which is fixed to the housing of compressor 10 and which, when energized, creates a strong magnetic field acting through and in front of pulley 14, capable of firmly pulling ferrous objects axially inwardly. Fixed to the front of pulley 14 is an annular friction disk 16, typically steel or another durable material. The clutch of the invention, indicated generally at 18, connects and disconnects friction disk 16 to shaft 12 in such a way as to transmit torque effectively from pulley 14 to shaft 12, but to dampen out the transmission of torsional vibrations back from shaft 12 back to pulley 14.

Still referring to FIGS. 1, 2 and 3, a central hub 20 is splined and bolted rigidly to the end of shaft 12, turning one to one with it. A generally triangular drive plate 22 is integrally formed with hub 20, extending radially outwardly to three equi-angularly spaced, truncated lobes 24, the ends of which represent radially outboard connection points. Drive plate 22 is a relatively thick, stamped steel member, not intended to be axially flexible. Torque is not transferred directly from pulley 14 to drive plate 22 and shaft 12. An annular steel armature plate 26, with an outer diameter similar to friction disk 16, is mounted to drive plate 22 by three spring steel leaf springs 28, best seen in dotted line in FIG. 2. The leaf springs 28 lie at an angle to chords of a circle corresponding to armature plate 26. The direction of rotation, as viewed in FIG. 2, is clockwise, and the leaf springs 28 are directionally oriented with their radially inner ends trailing, and radially outer ends leading, relative to the direction of rotation. The leaf springs 28 are fixed at their radially inner ends to the drive plate 22 with conventional rivets 30, sometimes referred to as "caulking rivets," which serve only to tightly fix the spring end to the inner surface of drive plate 22. In a conventional spring leaf clutch, the radially outer ends of springs 28 would also be fixed to the armature plate 26 by the same kind of conventional rivet, with no involvement of the drive plate 22 at the radially outboard connection points.

Figure 4:
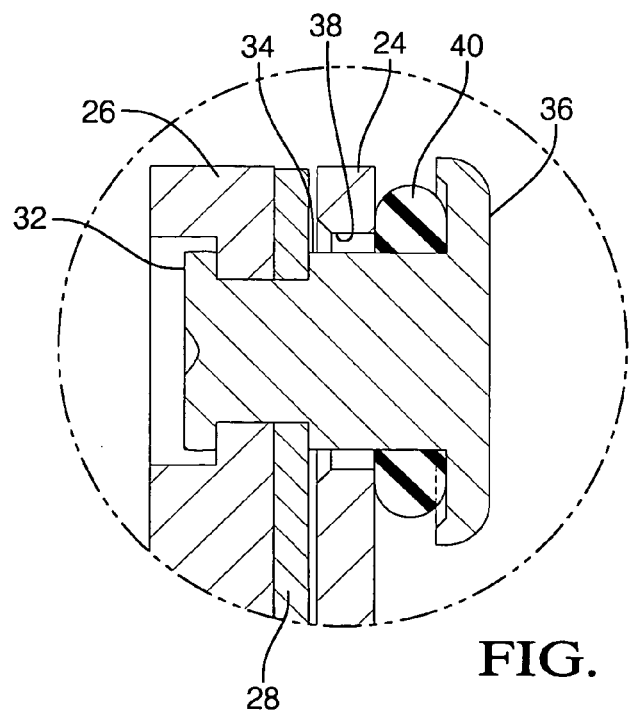
FIG. 4 is an enlargement of the circled area of FIG. 2.

Referring next to FIGS. 2 and 4, in the invention, a specially designed, combination connecter and damper rivet, indicated generally at 32, fixes the outboard end of each leaf spring 28 to the drive plate 22, as well as providing a damping function. Specifically, special rivet 32 has a stepped configuration, with a larger diameter shank 34 and head 36. The outboard end of each spring 28 is clamped tightly against the outer surface of armature plate 26 by the stepped shoulder provided by the larger diameter shank 34, much as a conventional clamping rivet would do. As such, the three springs 28, in a free, unflexed state, maintain and support armature plate 26 axially opposed to pulley disk 16 with a small, even gap X of a millimeter or two. The enlarged shank 34 also extends axially through a clearance hole 38 in the end of each drive plate lobe 24, with surrounding radial clearance from the clearance hole edge. Trapped beneath each rivet head 36 is damping elastomer material in the form of a torroidal shaped rubber ring 40, radially surrounding the clearance hole 38 and shank 34, but deliberately not intruding into the radial clearance between the outer surface of rivet shank 34 and the edge of clearance hole 38. Finally, conventional rubber bumpers 42 inserted through drive plate 22 engage the outer surface of armature plate 26 when it is in the disengaged state. Bumpers 42 do not form part of the subject invention per se, but are easily incorporated, since the invention structurally departs from a standard leaf spring design very minimally. Overall, the clutch 18 of the invention adds only the radially extended drive plate lobes 24, the enlarged shank 34 and head 36 of the special rivet 32, and the rubber rings 40. As such, it is simple and cost effective, as compared to the much more complex designs damping described above.

Figure 5:
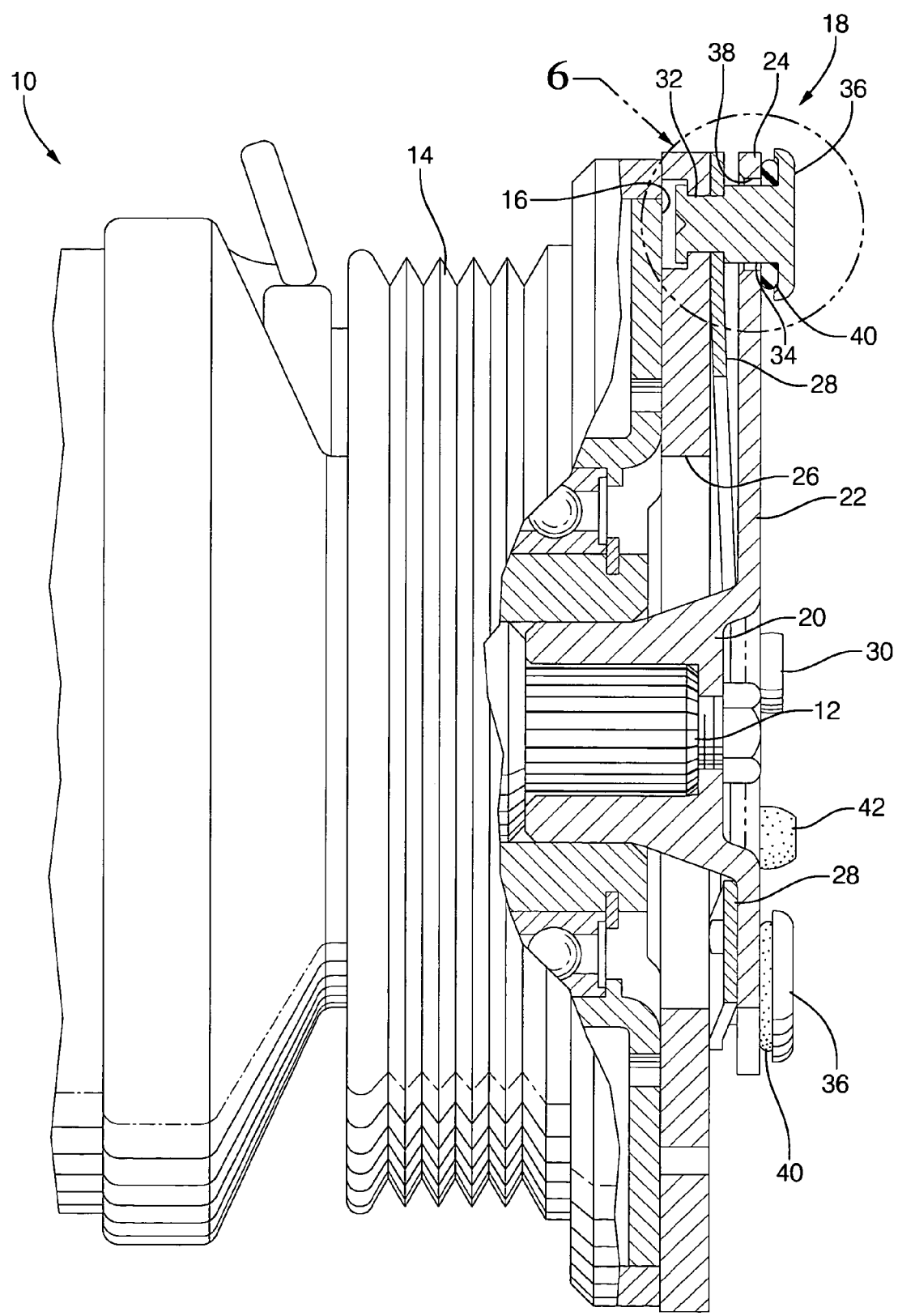
FIG. 5 is a view similar to FIG. 2, but showing the clutch in an engaged position.
Figure 6:
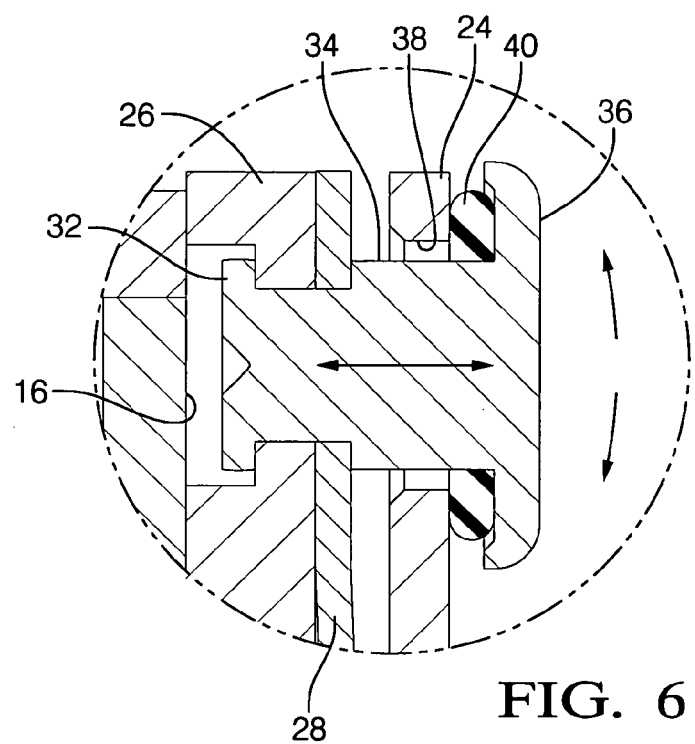
FIG. 6 is an enlargement of the circled area of FIG. 5.
Figure 7:
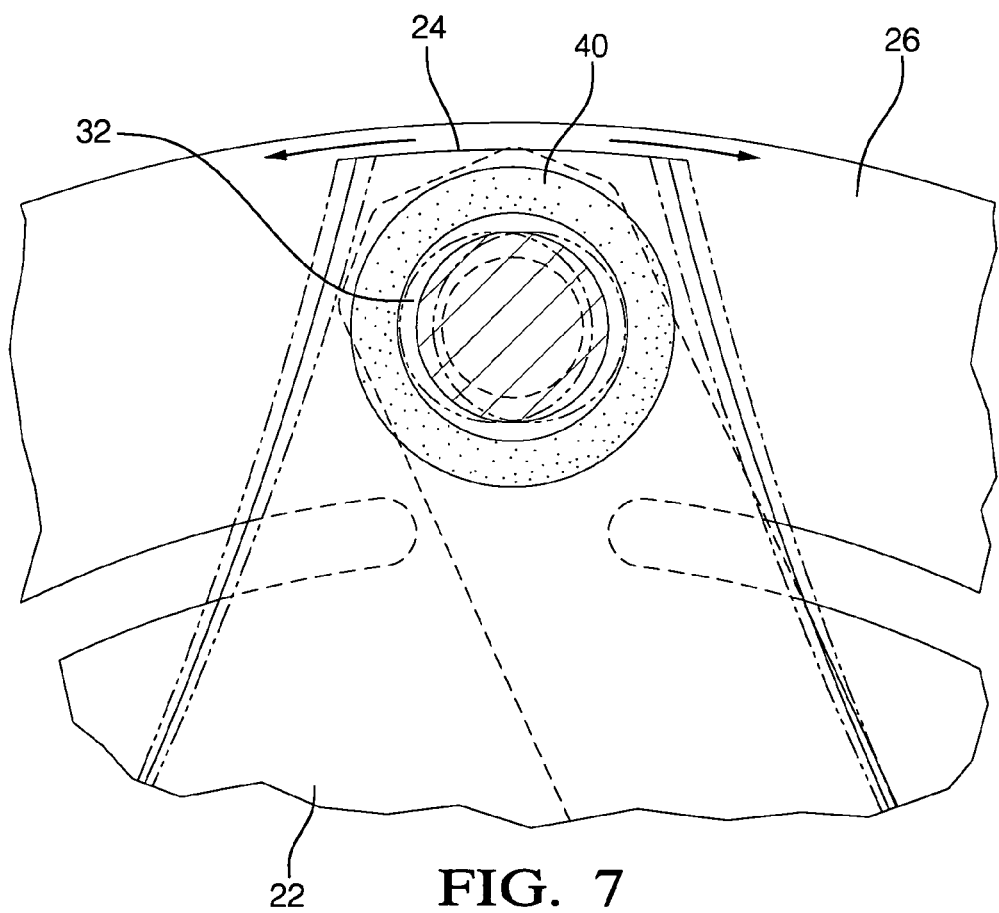
FIG. 7 is a plan view of a damper, from the same perspective as FIG. 3, schematically indicating the torsional vibration damping process.

Despite its simplicity, clutch 18 is able to provide a damping function similar to more complex clutch designs. As seen in FIGS. 5 and 6, when the clutch coil 50 is activated and energized, armature plate 26 is pulled axially tightly against the face of pulley disk 16, and the leaf springs 28 flex axially inwardly as shown. Armature plate 26 quickly spins up to pulley speed. The armature plate 26 transfers torque to drive plate 22 and shaft 12, through the springs 28, which act in compression, and which do not twist or buckle substantially out of shape as they transfer torque in compression. It is not intended that torque be transferred directly from the drive plate 22 to the armature plate 26, through the enlarged rivet shanks 34, as they have radial clearance from the edges of the clearance holes 38. As the leaf springs 28 flex inwardly, the rubber rings 40 compress to a degree equal to the axial gap X that is closed up, and cushion the shock of initial engagement. The radial clearance between the clearance holes 38 and the rivet shanks 34 allow the axial motion to occur unimpeded. Some minimal torque could be so transferred through the medium of the axially compressed rubber rings 40, but this will not, and is not intended to be, an efficient path for torque transmission, and not nearly so efficient as it would be if rubber material were located in the radial clearance between the clearance holes 38 and the rivet shanks 34. During compressor operation, torsional vibrations or oscillations will attempt to transmit back from the shaft 12, drive plate 22 and through the springs 28 into armature plate 26, slightly flexing and twisting the springs 28 in the process. Ultimately, vibrations so transmitted to the armature plate 26 could be transmitted to the pulley disk 16 and the rest of the vehicle, in the absence of a dampening mechanism. Concurrently with this slight vibrational flexing of the springs 28, relative motion occurs between the drive plate lobes 24 (and the edges of the clearance holes 38) and the outboard rivets 32. These vibrations may act axially back and forth along the axis of rivet 32, or transverse to its axis, as shown by the arrows in FIG. 6, or they may act angularly back and forth about the axis of shaft 12 (FIG. 7). However acting, such vibrations are dampened by the compressed rubber rings 40, located directly on and at the outboard rivets 32, and trapped beneath the rivet head 36. As is especially evident in FIG. 6, back and forth oscillations are dampened without the rubber rings 40 being continually sheared within the radial space between the outer surface of the rivet shank 34 and the edge of the clearance hole 38, as is true for conventional rubber dampers. Therefore, clutch 18 is durable and robust, as well as simple and cost effective. When the clutch 18 disengages, the springs 28 return armature plate 26 to the ready position of FIG. 4, the rings 40 decompress, and the rubber bumpers 42 axially cushion the shock of disengagement.

Variations in the preferred embodiment could be made. More leaf springs could be incorporated, although three has generally been found to be sufficient. Some designs incorporate what, in effect, is one large leaf spring with a plurality of active lobes or points riveted to the armature plate, rather than entirely separate leaf springs. So long as the drive plate had matching points overlying those points of interconnection between the leaf spring and armature plate, the same type of damper could be incorporated. The drive plate itself could be either integral with, or separate and fixed to, the central hub. The distinct lobes of the drive plate are not necessary to its operation as such, it could be a complete round disk, but considerations of weight will generally dictate that unnecessary material be removed. The rubber rings could, theoretically, be molded in place around the drive plate clearance holes, or beneath the enlarged rivet head, but a ring in the form of a separate component would likely be more cost effective to produce and handle.

What is claimed is:

1. An electromagnetically activated clutch for use in a fluid pumping apparatus having a central drive shaft, said central drive shaft being subjected to torsional vibrations when said pumping apparatus is operated, a powered friction disk surrounding the end of said drive shaft and freely rotatable about the axis thereof, and a selectively powered coil proximate said friction disk and capable of producing an attractive magnetic field in front of said friction disk, said clutch comprising, a generally annular armature disk of magnetic material capable of making tight frictional contact with said friction disk, a drive plate rigidly fixed to the end of said drive shaft and overlying said armature plate at a plurality of radially inboard points and at a plurality of radially outboard points, a plurality of axially flexible leaf spring members fixed tightly at their inner ends to said drive plate radially inboard points, a plurality of combination connector and damper rivets, each having a lower connecting portion tightly fixing the outer ends of the leaf springs to the armature at the radially outboard points so as to mount said armature plate substantially parallel to and axially spaced away from said friction disk by a predetermined axial gap, and a damper portion comprised of an enlarged diameter upper rivet shank extending axially through a clearance hole in said drive plate with radial clearance, said rivet shank further including a head that extends radially beyond the edge of said clearance hole and is axially spaced from said drive plate, and a damper associated with each rivet damper portion consisting of a compressible elastomer material surrounding each rivet shank and closely engaged between said rivet head and drive plate, while not intruding into the radial clearance between said rivet shank and drive plate clearance hole, whereby, when the coil is activated, the armature plate is pulled axially into the powered friction disk as the leaf springs flex and the elastomer material freely axially compresses between said rivet head and drive plate without intruding into said radial clearance, by virtue of said radial clearance, torque is transferred to the drive plate and shaft primarily through the leaf springs to operate the pumping apparatus, while torsional vibrations created by the operating pumping apparatus and transmitted from the shaft and drive plate through the leaf springs are dampened by the compressed elastomer material as the drive plate moves slightly relative to the rivet damper portions in response to the torsional vibrations.

2. An electromagnetically activated clutch according to claim 1, in which the fluid pumping apparatus is a refrigerant compressor.

3. An electromagnetically activated clutch according to claim 2, in which the drive plate is generally triangular in shape, with three truncated lobes comprising the radially outer connection points, and the leaf spring members comprise three separate leaf springs.

4. An electromagnetically activated clutch according to claim 3, in which the elastomer material comprises rubber rings.

* * * * *